(No Model.)

J. T. COCHRAN.
BITUMINOUS ROCK REDUCING MACHINE.

No. 482,914.   Patented Sept. 20, 1892.

Witnesses,
H. Towse
J. A. Bayless

Inventor,
John T. Cochran
By Dewey & Co.
Atty's

UNITED STATES PATENT OFFICE.

JOHN T. COCHRAN, OF OAKLAND, CALIFORNIA.

BITUMINOUS-ROCK-REDUCING MACHINE.

SPECIFICATION forming part of Letters Patent No. 482,914, dated September 20, 1892.

Application filed April 25, 1892. Serial No. 430,591. (No model.)

*To all whom it may concern:*

Be it known that I, JOHN T. COCHRAN, a citizen of the United States, residing at Oakland, Alameda county, State of California, have invented an Improvement in Bituminous-Rock-Reducing Machines; and I hereby declare the following to be a full, clear, and exact description of the same.

My invention relates to an apparatus for the preparation of bituminous rock for the purpose of forming pavements, sidewalks, and other surfaces to which it is applicable.

It consists, essentially, of a series of oppositely-traveling carrying-belts inclosed within a casing and so arranged with relation to each other that each upper belt shall deliver its contents from the discharge end upon the receiving end of the belt below, and in conjunction with this a series of guides to direct the material and heaters by which the temperature is raised, so that it will be in proper condition for pulverizing and further work when discharged from the machine.

Figure 1:
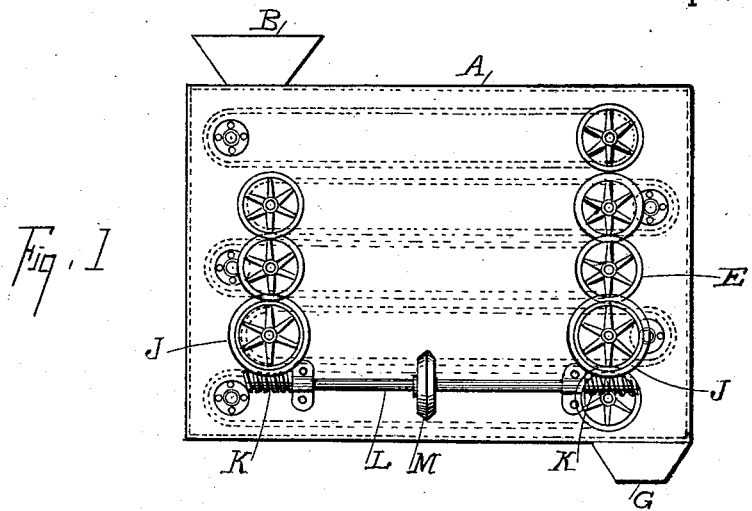
Figure 2:
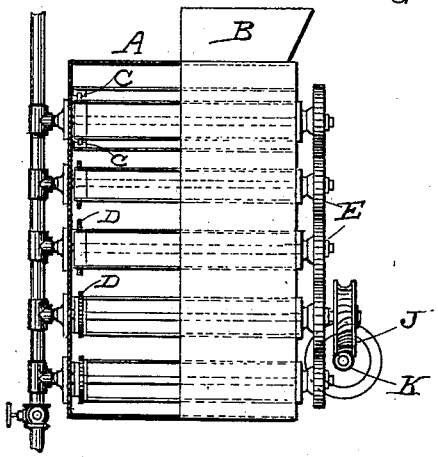
Figure 3:
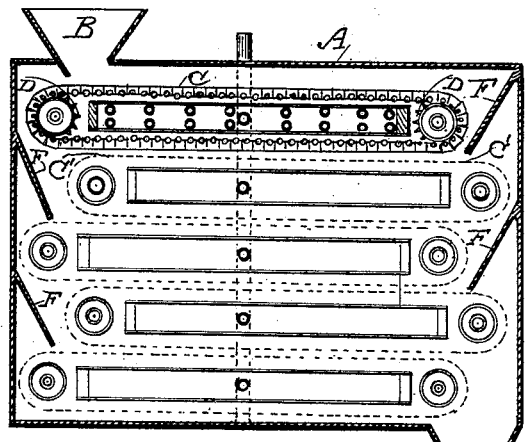

Referring to the accompanying drawings for a more complete explanation of my invention, Figure 1 is a side elevation of the apparatus. Fig. 2 is a transverse vertical section across one end of the machine. Fig. 3 is a longitudinal vertical section.

A is an exterior tight casing made, preferably, of metal or suitably-jacketed material which will retain the heat within it. At the top, near one end, is a hopper B, into which the material to be treated is placed and from which it falls upon a flexible carrying-belt C. This belt is made of chains with transverse bars extending from one to the other, and the chains pass around sprocket-wheels D at each end, the shafts of the wheels being properly journaled and extending through the side of the casing to receive gear-wheels E, by which power is transmitted to drive the belt. Beneath this belt is a second belt C', passing around similar sprocket-wheels, the projecting shaft of one or both having gear-wheels engaging with those of the upper shaft, so that power is transmitted from one to the other and the lower one is driven in the opposite direction from the one above. The receiving end of the lower belt extends a short distance beyond the discharge end of the upper belt, as shown plainly in Fig. 3, so that the material which is delivered from the upper belt will fall upon the one below and by it be transferred to the opposite end of the casing.

F is an inclined guide-plate so placed with reference to the two belts that the material which falls from the upper belt will be directed upon the lower belt and prevented from falling over the end.

Beneath the belt C' are as many more similar belts as are necessary, arranged in the same manner, having driving-gears and moving alternately in opposite directions, so that the material will be transported from one end to the other of the machine, gradually moving downward until it reaches the bottom, where it is discharged from the end of the lowermost belt and falls through a delivery-hopper G, from which it passes to any crushing or pulverizing apparatus for further treatment. In order to heat this passing material without applying steam directly to it, I have shown a series of pipes extending backward and forward between the upper and lower surfaces of the belts and closely enough to them so that the heat from the pipes will act directly upon the material being transported by the belts. The diameter of the carrying sprocket-wheels is sufficient to allow these pipes to be properly disposed between the upper and lower sections of each belt, and the outer ends of these pipes are connected with the steam-supply pipe I, which extends upon one side of the apparatus and connects with the boiler or other source of supply. (Not here shown.) The lower end of this pipe is provided with a discharge-cock or steam-trap, which allows the accumulation of condensed water to be drawn off from time to time, as may be desired.

J is a worm-wheel fixed upon one of the shafts which project through the side of the casing, and K is a screw which engages the teeth of this wheel. This screw is mounted upon a shaft L, journaled at the side of the casing and having a belt-gear or friction-wheel M, through which motion is communicated to the shaft L, and through this, the screw K, wheel J, and the gearing previously described to all the belts in the series, thus causing them all to move simultaneously and gradually transfer the contents from the hopper to the discharge-opening. The amount of heat is regulated by suitable cocks in the supply-pipe, so that more or less steam may be delivered into either set of the heating-pipes.

Having thus described my invention, what I claim as new, and desire to secure by Letters Patent, is—

1. A machine for treating bituminous rock, consisting of the exterior casing, a series of horizontal traveling carrying-belts, sprocket-wheels around which said belts pass, gears upon the outer projecting ends of the shafts of said wheels, whereby motion is communicated to them, a hopper in the top of the casing, through which material is delivered upon the upper belt, and a discharge-opening at the bottom of the casing, through which the material is delivered, substantially as herein described.

2. A machine for treating bituminous rock, consisting of a casing, a receiving-hopper at one end of the top, a discharge-opening at the opposite end of the bottom, a series of horizontal traveling belts situated one above the other, the receiving end of each lower belt extending beyond the discharge end of the belt above, and inclined guide-plates extending from the end of the casing to near the surface at the end of the receiving-belt, whereby the material is directed from one belt to another, substantially as herein described.

3. An apparatus for treating bituminous rock, consisting of a casing having a hopper at one end of the top, a discharge-opening at the opposite end of the bottom, a series of horizontal traveling belts situated one above the other and so arranged that the receiving end of each belt extends beyond the discharge end of the belt above, inclined guide-plates extending from the ends of the casing to near the surface at the receiving end of each belt, heating-pipes extending between the upper and lower surfaces of each belt, and a steam-supply pipe connecting with each series of pipes and having controlling-clocks, whereby the moving material may be heated and the temperature regulated, substantially as herein described.

4. A machine for treating bituminous rock, consisting of a series of horizontally-traveling belts passing around sprocket-wheels journaled within a casing, having a receiving-hopper at one end of the top and a discharge-opening at the opposite end of the bottom, the receiving end of each belt extending beyond the discharge end of the belt above, having an inclined guide by which the material is directed from one belt to the other, gear-wheels fixed upon the outer ends of the shafts which project through the side of the casing and engaging each other, so as to drive the alternate belts in opposite directions, a worm-wheel and screw and driving-shaft, whereby power is transmitted to move the belts simultaneously, and a heating apparatus consisting of closed steam-jackets disposed between the upper and lower surfaces of each belt, each being independently connected with the main supply-pipe, having clocks by which the amount of steam admitted to each jacket may be regulated, substantially as herein described.

In witness whereof I have hereunto set my hand.

JOHN T. COCHRAN.

Witnesses:
J. R. SEARS,
R. S. ALLEN.